(12) United States Patent
Tseng et al.

(10) Patent No.: US 7,961,931 B2
(45) Date of Patent: Jun. 14, 2011

(54) POSITIONING MEASUREMENT APPARATUS AND METHOD

(75) Inventors: Sheng-Peng Tseng, Shenzhen (CN); Xiao-Man Pu, Shenzhen (CN)

(73) Assignees: Ensky Technology (Shenzhen) Co., Ltd., Baoan District, Shenzhen, Guangdong Province (CN); Ensky Technology Co., Ltd., Banqiao Dist., New Taipei (TW)

( * ) Notice: Subject to any disclaimer, the term of this patent is extended or adjusted under 35 U.S.C. 154(b) by 902 days.

(21) Appl. No.: 11/877,669

(22) Filed: Oct. 24, 2007

(65) Prior Publication Data

US 2008/0103726 A1 May 1, 2008

(30) Foreign Application Priority Data

Nov. 1, 2006 (CN) .......................... 2006 1 0063415

(51) Int. Cl.
*G06K 9/00* (2006.01)
*G06K 9/62* (2006.01)

(52) U.S. Cl. ........................ 382/141; 382/209; 382/216

(58) Field of Classification Search .......... 382/141–151, 382/209, 216–221
See application file for complete search history.

(56) References Cited

U.S. PATENT DOCUMENTS

| 5,067,162 A * | 11/1991 | Driscoll et al. ............... 382/126 |
| 5,750,990 A | 5/1998 | Mizuno |
| 5,956,419 A * | 9/1999 | Kopec et al. .................. 382/159 |
| 6,009,212 A * | 12/1999 | Miller et al. .................. 382/294 |
| 6,408,107 B1 * | 6/2002 | Miller et al. .................. 382/294 |
| 6,411,731 B1 * | 6/2002 | Saito ............................. 382/173 |
| 6,553,152 B1 * | 4/2003 | Miller et al. .................. 382/294 |
| 6,633,686 B1 * | 10/2003 | Bakircioglu et al. ......... 382/294 |
| 6,915,003 B2 * | 7/2005 | Oosawa ........................ 382/130 |
| 6,968,084 B2 * | 11/2005 | Satoh ............................ 382/190 |
| 7,146,347 B1 * | 12/2006 | Vazquez et al. ................ 706/12 |
| 7,173,268 B2 | 2/2007 | Tanaka |
| 7,454,065 B2 * | 11/2008 | Satoh ............................ 382/190 |
| 2003/0152275 A1 * | 8/2003 | Chung et al. .................. 382/218 |
| 2003/0185446 A1 * | 10/2003 | Huang et al. .................. 382/218 |
| 2003/0185447 A1 * | 10/2003 | Huang et al. .................. 382/218 |
| 2003/0185462 A1 * | 10/2003 | Hsieh ............................ 382/286 |
| 2005/0002070 A1 * | 1/2005 | Nakaya et al. ................ 358/500 |
| 2005/0207636 A1 * | 9/2005 | Liu et al. ....................... 382/141 |
| 2006/0038986 A1 * | 2/2006 | Honda et al. ................ 356/237.1 |
| 2006/0045350 A1 * | 3/2006 | Itoh et al. ..................... 382/209 |
| 2006/0066649 A1 * | 3/2006 | Hirashima et al. ............... 347/5 |

(Continued)

FOREIGN PATENT DOCUMENTS

JP         10103922         4/1998

*Primary Examiner* — Aaron W Carter
(74) *Attorney, Agent, or Firm* — Winston Hsu; Scott Margo

(57) ABSTRACT

A positioning measurement method is provided. The method includes the step of: capturing images of a standard object and to-be-measured objects; selecting one or more standard points from the image of the standard object; selecting a general location area and a standard area by taking each standard point as a reference point; generating a script for recording positions of each general location area and capturing a standard image in each standard area; storing the script into the data storage; determining the position of the general location area on the image of the to-be-measured object according to the position of general location area recorded in the script; and determining a measurement area, the image in the measurement area is most similar to the standard image within the general location area.

10 Claims, 9 Drawing Sheets

U.S. PATENT DOCUMENTS

2006/0164682 A1* 7/2006 Lev .............................. 358/1.15
2007/0019842 A1* 1/2007 Kang ............................ 382/117
2007/0248258 A1* 10/2007 Mitsui .......................... 382/151
2009/0226076 A1* 9/2009 Sakai et al. ................... 382/149
2009/0268959 A1* 10/2009 Harada et al. ................ 382/149
2010/0149322 A1* 6/2010 Lev ................................ 348/61

* cited by examiner

US 7,961,931 B2

POSITIONING MEASUREMENT APPARATUS AND METHOD

BACKGROUND

1. Field of the Invention

The present invention relates to a positioning measurement apparatus and method for the same.

2. Description of Related Art

Generally, measurement tools such as rulers and calipers are used to measure dimensions of objects. Conventionally, these dimension measuring processes are manual operations and personnel are required to operate these measurement tools and to record measurement results. When multiple dimensions of a large number of objects are measured, it involves many operators and can be time consuming to measure the dimensions of the objects. In addition, in general, manual operations inevitably tends to have human error in the measurement process. Thus, the manual operations have less efficiency and low measurement precision. Furthermore these measurement tools are only used to measure dimension of objects.

Currently, with the development of electronic technologies, electronic measurement tools are used widely. The electronic measurement tools have high measurement precision, can automatically record the measurement result, and can also measure other parameters besides the dimensions. However, the electronic measurement tools are expensive and they are often used for measuring high precision objects. When low precision measurements are needed, the electronic measurements tools are unnecessary.

Therefore, what is needed is a positioning measurement apparatus and method which has a relatively high measurement precision and low cost.

SUMMARY

A positioning measurement method is provided. The method includes the step of: capturing images of a standard object or to-be-measured objects; selecting one or more standard points on the image of standard object; selecting a general location area and a standard area by taking each standard point as a central; generating a script by recording the position of each standard range area on the image of the standard object and capturing a standard image in each standard area; storing the script into a data storage; determining the position of the general location area on the image of the to-be-measured object according to the position of general location area recorded in the script; and determining a measurement area, the image in the measurement is most similar to the standard image within the general location area.

Other advantages and novel features will be drawn from the following detailed description of the preferred embodiment with reference to the attached drawings.

DETAILED DESCRIPTION OF THE INVENTION

Figure 1:
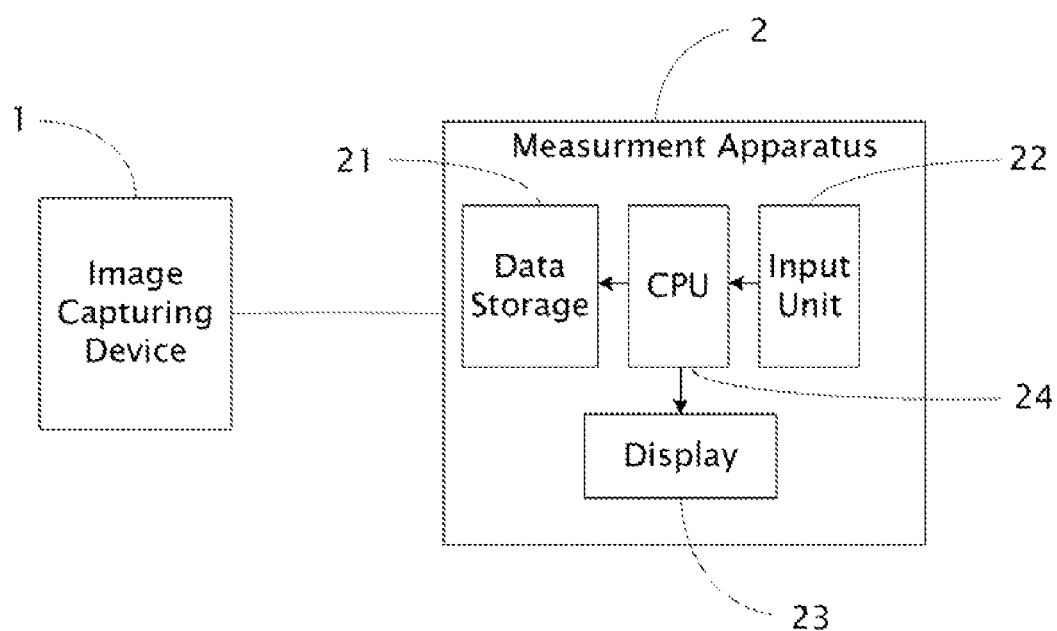
FIG. 1 is an exemplary hardware infrastructure diagram of a positioning measurement system.

FIG. 1 is an exemplary hardware infrastructure diagram of a positioning measurement system (hereinafter "the system") in accordance with a preferred embodiment of the present invention. The system includes an image capturing apparatus 1 and a measurement apparatus 2. The image capturing apparatus 1 is for capturing images of objects. The images of objects can be stored in the measurement apparatus 2. In the preferred embodiment, the images of the objects can be images of standard objects or to-be-measured objects. The standard objects are objects that satisfy a predetermined standard specification. The to-be-measured objects are objects that need to be measured for determining whether they satisfy a standard specification. The measurement apparatus 2 is for measuring parameters of the to-be-measured objects.

The measurement apparatus 2 includes a data storage 21, an input unit 22, a display 23, and a central processing unit (CPU) 24. The data storage 21 stores the images of the standard objects and the to-be-measured objects generated from the image capturing apparatus 1. The input unit 22 is for generating instructions in response to operations of a user during a measurement process. The display 23 is for displaying information related to the measurement process, e.g., measurement results of the to-be-measured objects. The CPU 24 is for receiving the instructions generated from the input unit 22 and implementing the measurement process according to the instructions. The detailed description of the measurement process implemented by the CPU 24 will be described below by referring to FIGS. 2 to 6.

Figure 2:
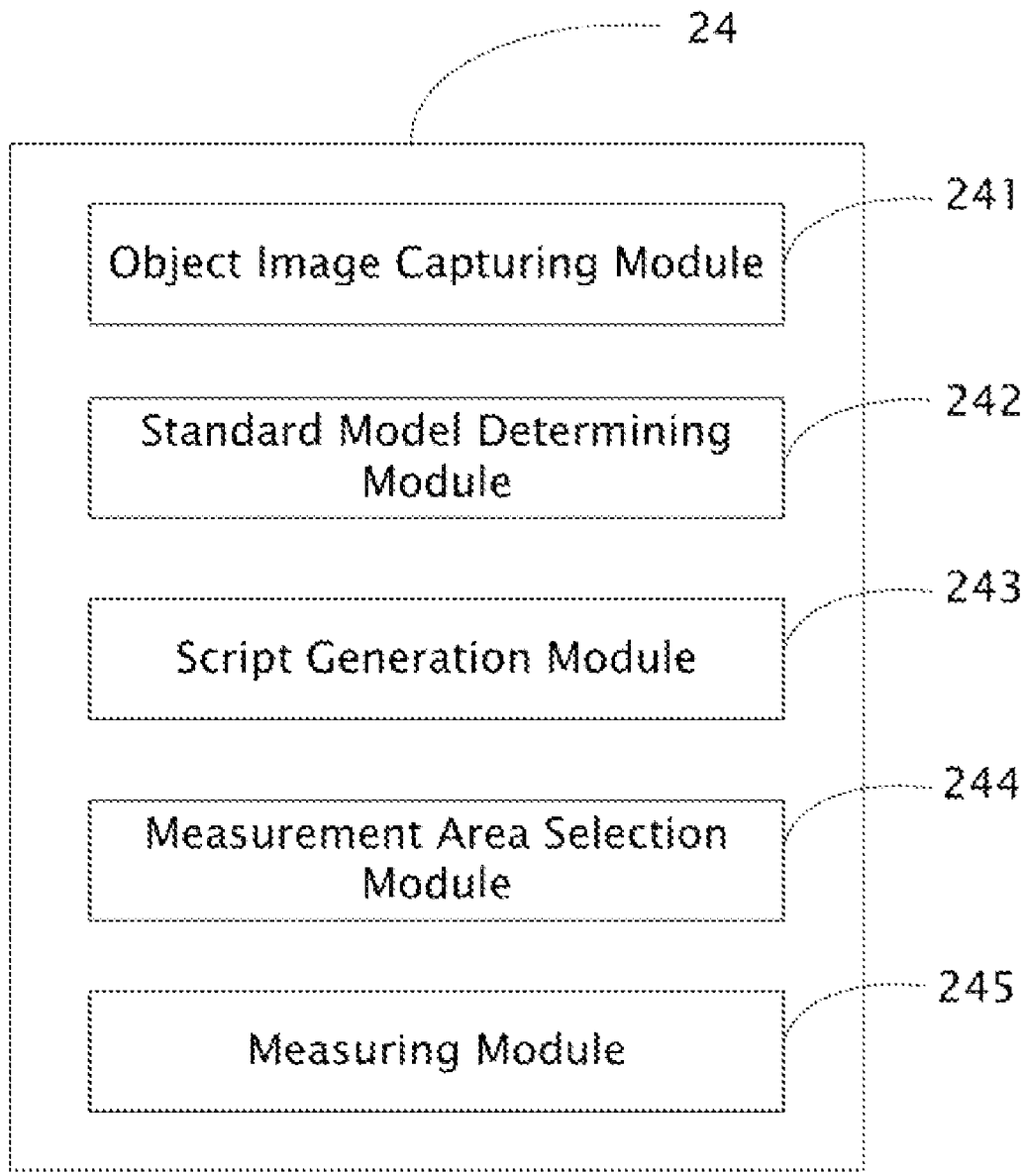
FIG. 2 is a diagram of main function modules implemented by a CPU of a measurement apparatus of FIG. 1.

FIG. 2 is a diagram of the main function modules implemented by the CPU 24. The CPU 24 includes an object image capturing module 241, a standard model determining module 242, a script generation module 243, a measurement area selection module 244, and a measuring module 245. In this preferred embodiment, a rivet is taken as an exemplary to-be-measured object. The rivet includes a shank 31 and a head 32 (see FIG. 3). A shank diameter measurement process of the rivet will be described below.

Figure 3A:
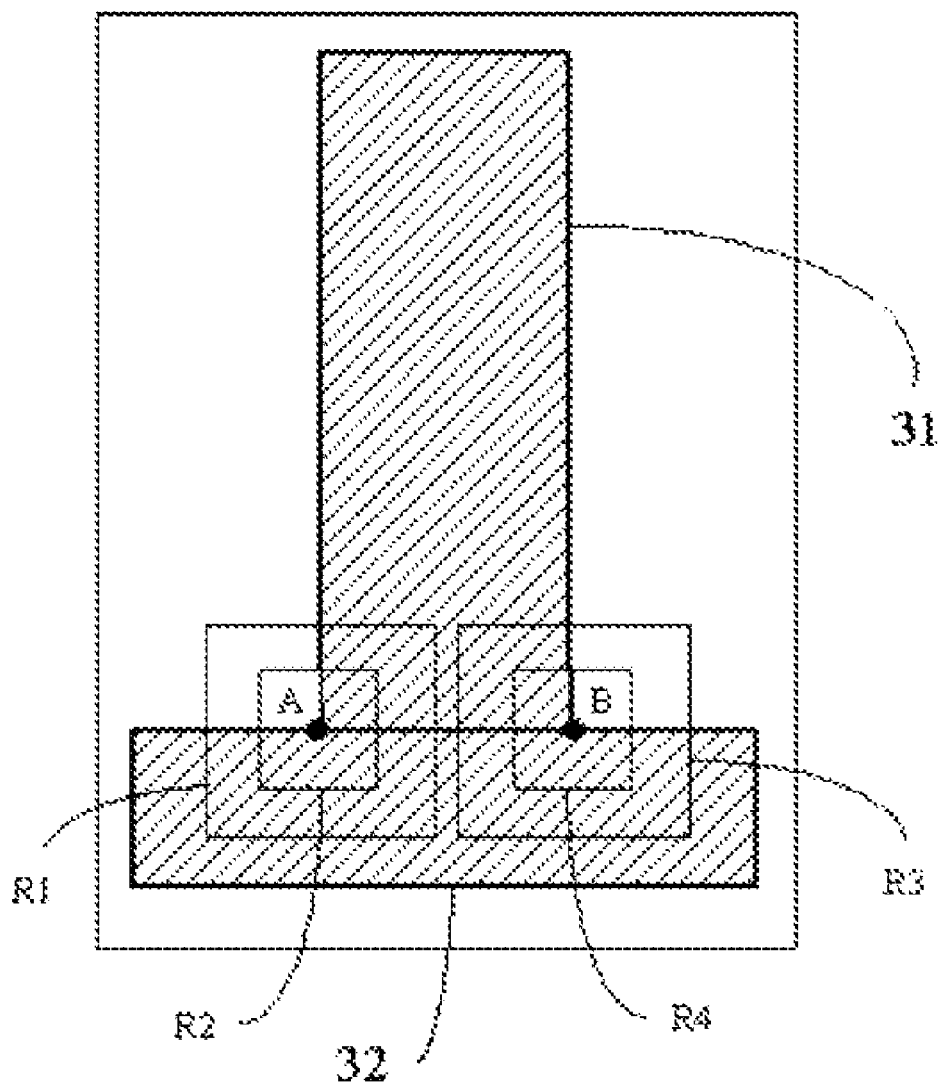
FIGS. 3a to 3b are schematic diagrams showing how to generate a script according to a standard rivet.
Figure 3B:
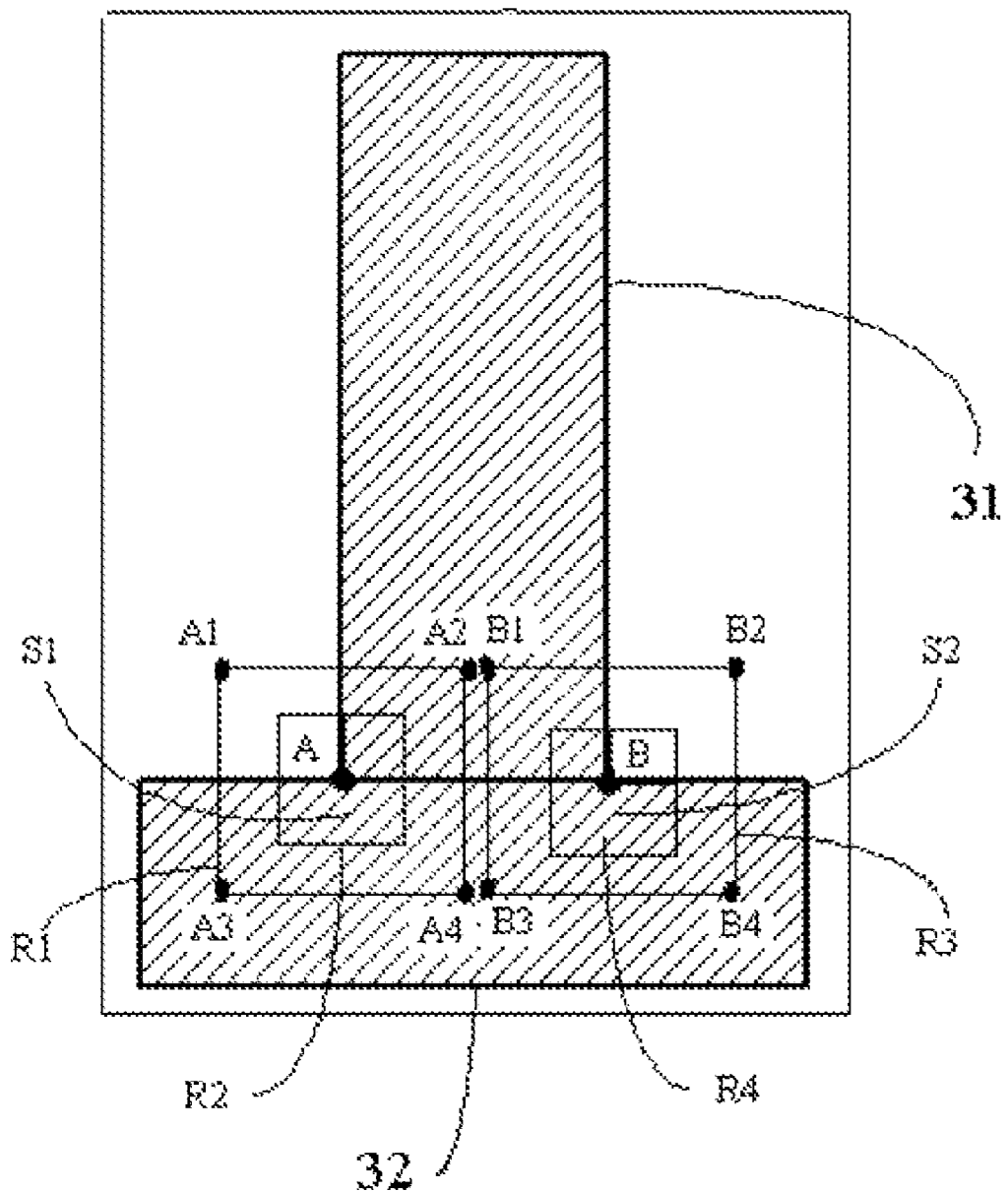
Figure 4A:
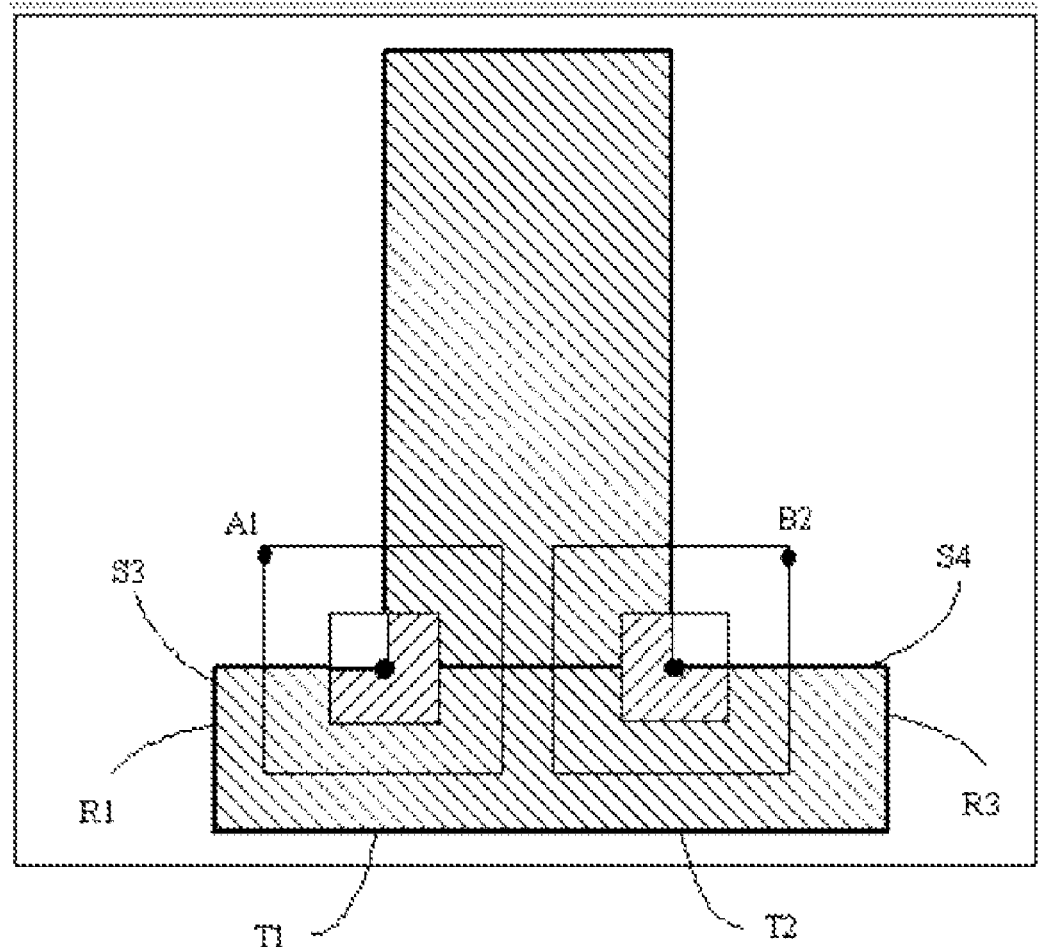
FIG. 4a to FIG. 4c are schematic diagrams showing the shank diameter measurement process of a to-be-measured rivet.
Figure 4B:
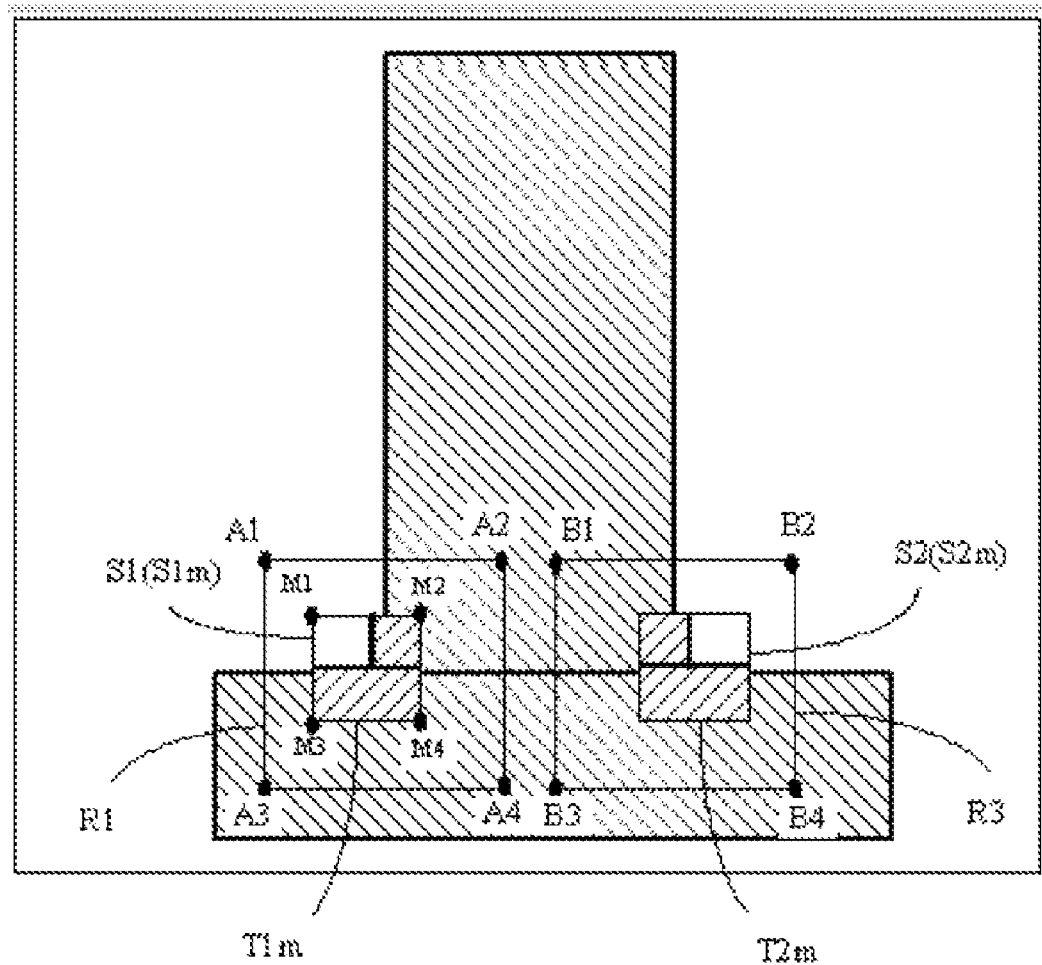
Figure 4C:
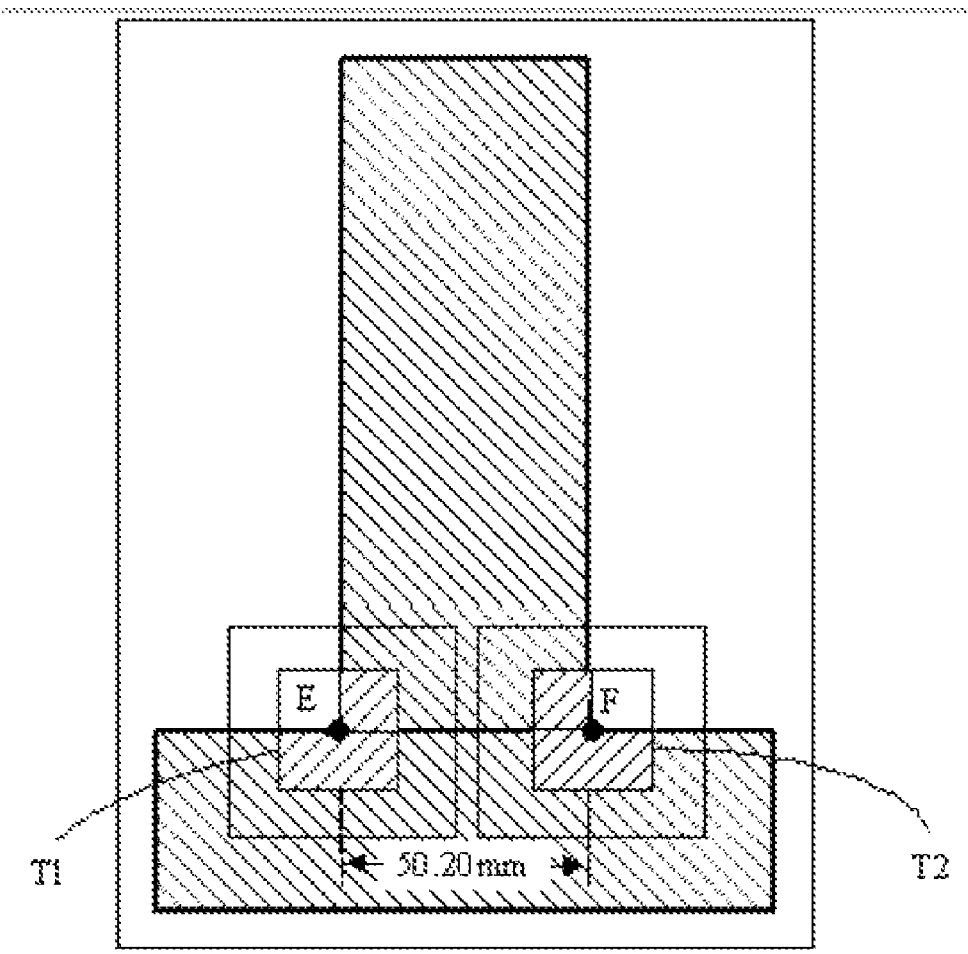

FIG. 3a~FIG. 3b are schematic diagrams showing how to generate a script according to a standard rivet. FIG. 4a~FIG. 4c are schematic diagrams showing the shank diameter measurement process of a to-be-measured rivet. Firstly, the object image capturing module 241 captures an image of a standard rivet according to a capturing instruction, and displays the image of the standard rivet on the display 23. Referring to FIG. 3a, intersection points A, B where the shank 31 of the standard rivet meets the head 32 of the standard rivet are selected as standard points. The standard model determining module 242 takes the standard point A as a reference point to select a first general location area R1 and a first point area R2, and takes the standard point B as another reference point to select a second general location area R3 and a second standard area R4. The general location areas R1, R3, and the standard areas R2, R4 are preferably rectangles. In the preferred embodiment of the present invention, the first general location area R1 has a same size as that of the second general location area R3, and the first standard area R2 has a same size as that of the second standard area R4. The general location areas R1, R3 are bigger than the standard areas R2 and R4.

Referring to FIG. 3b, the script generation module 243 records coordinates of four vertex A1, A2, A3, A4 which defines a size and position of the first general location area R1, and records coordinates of four vertexes B1, B2, B3, B4 which defines a size and position of the second standard area R3, and captures a standard image S1 from the standard area R2 and a standard image S2 from the standard area R4. The script generation module 243 generates a script for recording the coordinates of the vertexes A1-A4, B1-B4, and the standard images S1, S2, and stores the script in the data storage 21.

Referring to FIG. 4a, the measurement area selection module 244 runs the script generated by the script generation module 243 to select two points in the image of the to-be-measured rivet. The two points are used for determining a shank diameter of the to-be-measured rivet. The measurement area selection module 244 respectively determines positions of the first and second general location areas R1 and R3 in the image of the to-be-measured rivet according to the coordinates of the vertex A1, A2, A3, A4, and B1, B2, B3, B4 recorded in the script, and determines a first and a second general location areas T1 and T2 according to the standard images S1 and S2 recorded in the script. Images S3 in the determined measurement areas T1 has the lowest difference to the standard images S1 and Images S4 in the determined measurement areas T2 has the lowest difference to the standard images S2.

The method of selecting the measurement areas T1 and T2 is described in the following. Referring to FIG. 4b, firstly, the measurement area selection module 244 moves the standard images S1 with a predetermined displacement within the general location area R1 and moves the standard images S2 with a predetermined displacement within the general location R3. After the mth movement of the standard image S1 and S2, areas where the standard images S1 and S2 respectively locate are respectively recorded as an alternative area $T_{1m}$ and an alternative area $T_{2m}$, and images in the alternative areas $T_{1m}$ and $T_{2m}$ are respectively recorded as alternative images $S_{1m}$ and $S_{2m}$. The measurement area selection module 244 respectively computes a difference D1m between the standard image S1 and the alternative image S1m, and a difference D2m between the standard image S2 and the alternative image S2m. The present invention applies a same method to compute the differences $D_{1m}$ and $D_{2m}$. For simplicity, the method of computing the difference $D_{1m}$ is taken for example.

The measurement area selection module 244 respectively obtains luminance of each pixel $T_i$ and $I_i$ of the standard image S1 and the alternative image $S_{1m}$, and computes the difference $D_{1m}$ between the standard image S1 and the alternative image $S_{1m}$ according to a formula $$D_{1m} = \sum_{i=1}^{i=n} [Ti - Ii]2,$$

wherein, n is a total number of the pixels in the standard image and the alternative image, and i is a natural number and is less or equal to n.

After the difference $D_{1m}$ between the alternative image $S_{1m}$ and the standard image S1 is determined, the difference $D_{1m}$ and coordinates of four vertexes M1, M2, M3, M4 of the corresponding area $T_{1m}$ are stored in the data storage 21. The measurement area selection module 244 repeats the method described above until all difference $D_{1m}$ between other alternative images $S_{1m}$ and the standard image S1 are determined and obtained. When the measurement area selection module 244 obtains a last difference $D_{1m}$ between a last alternative image $S_{1m}$ and the standard image S1, referring to FIG. 5, the measurement area selection module 244 selects a minimal difference $D_{1m}$ in all the differences $D_{1m}$, thereby, an area which has the minimal difference $D_{1m}$ is determines as the measurement area T1. The measurement area T2 can be determined as same as the measurement area T2.

Referring to FIG. 4c, the measuring module 245 determines reference points of the measurement areas T1 and T2 as measurement points E and F respectively, and measures a distance between the measurement points E and F to obtain shank diameter of the rivet. The measuring module 245 further outputs the measured distance to the display 23 for show, and stores the measured distance in the data storage 21.

If the images of the standard objects and to-be-measured objects are colored images, chroma of the to-be-measured objects can also be determined. Firstly, an RGB value of the standard area R2 of the standard object can be computed. When the measurement area T2 of the to-be-measured object is determined, an RGB value of the measurement area T2 can also be computed. And then the measuring module 245 compares the RGB value of the standard area R2 with the RGB value of the measurement area T1. If the difference between the two RGB values is beyond a predetermined range, the measuring module 245 determines that the chroma of the to-be-measured object does not meet the predetermined standard specification.

Figure 5:
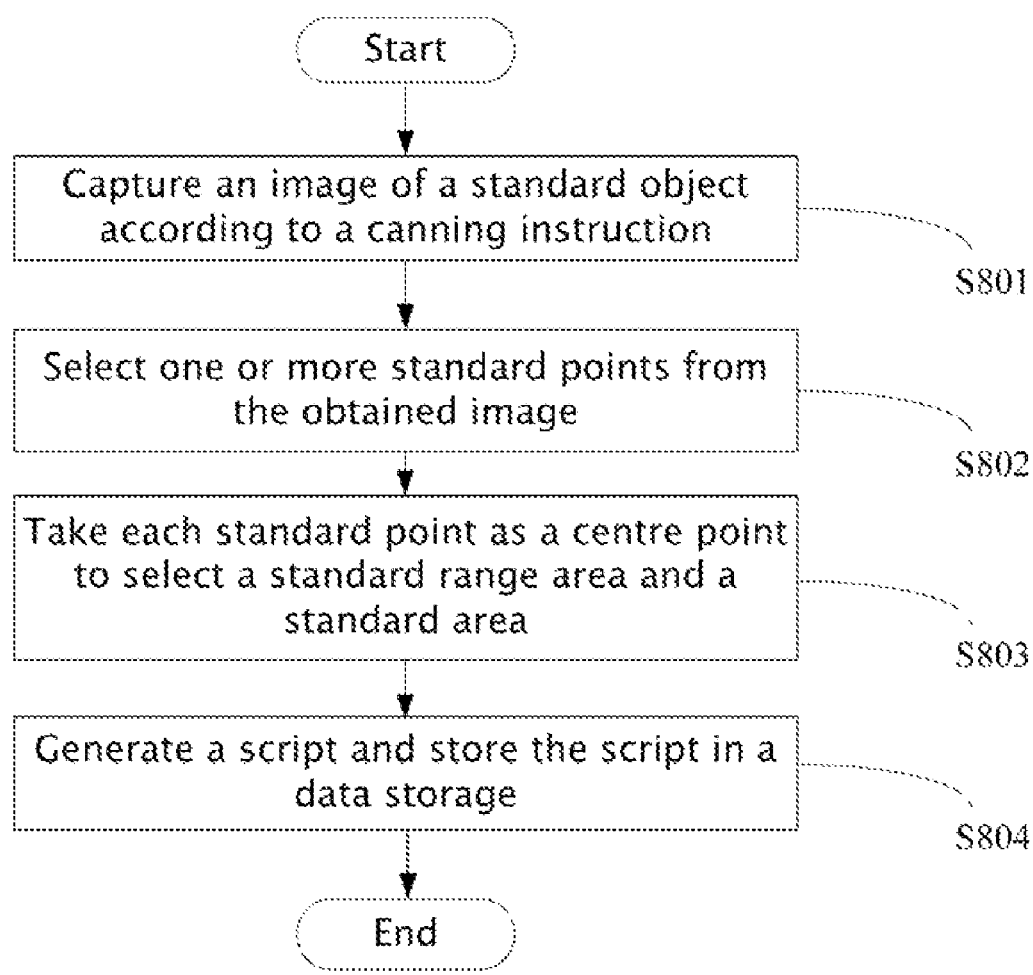
FIG. 5 is a flow chart for generating the script.

FIG. 5 is a flow chart for generating the script. In step S801, the object image capturing module 241 receives a capturing instruction from the input unit 22 and controls the image capturing apparatus 1 to obtain the image of the standard object according to the capturing instruction.

In step S802, the standard model determined module 242 selects one or more standard points from the image of the standard object to response to a measurement request.

In step S803, the standard model determining module 242 takes each standard point as the reference point to select the general location area and the standard area, and the general location area is bigger than the standard area.

In step S804, the script generation module 243 records the position of each general location area and captures the standard image in each measurement area to generate a script and stores the script in the data storage 21.

Figure 6:
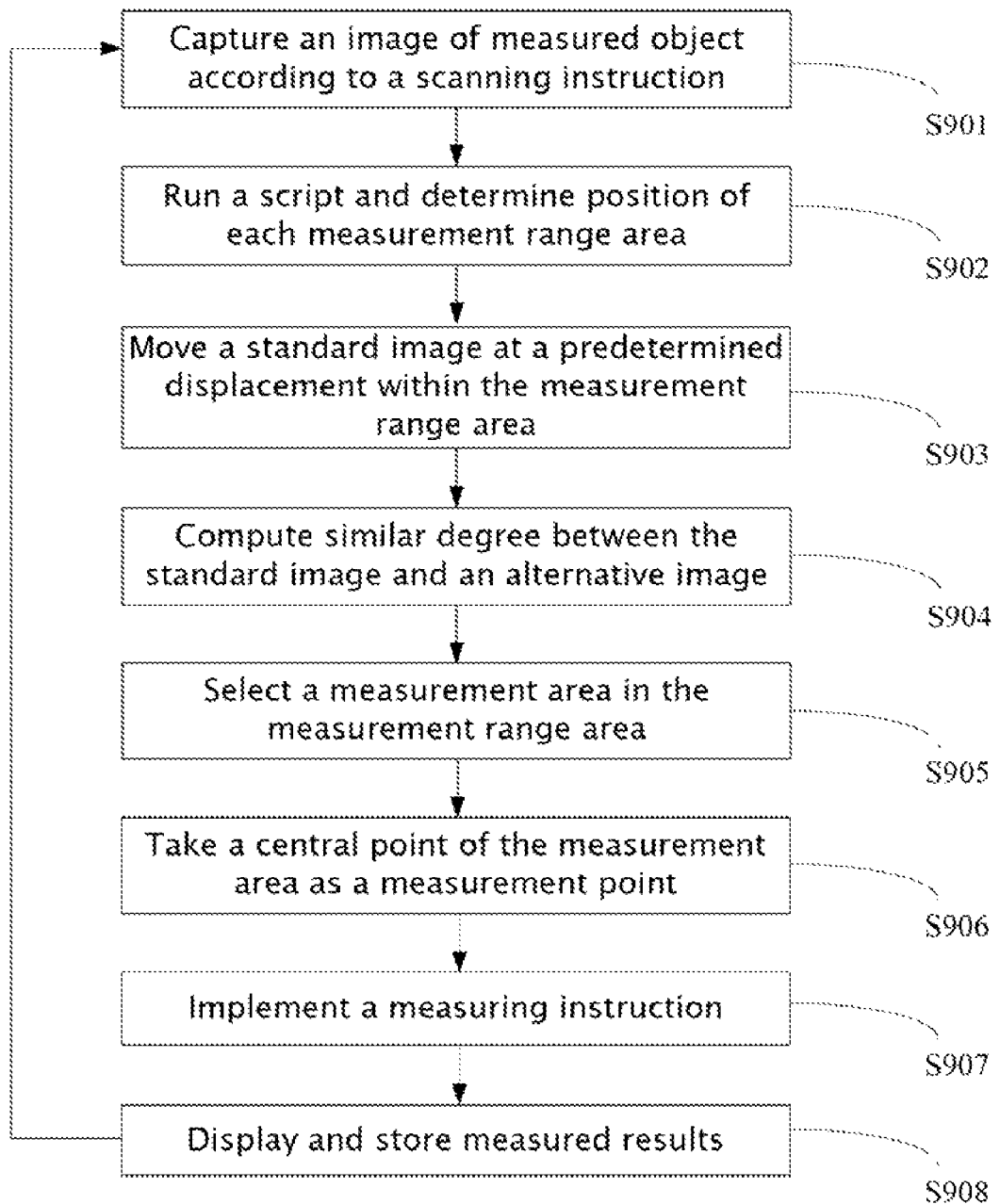
FIG. 6 is a flow chart of a positioning measurement method.

FIG. 6 is a flow chart of the positioning measurement method. In step S901, the object image capturing module 241 receives the capturing instruction from the input unit 22 and controls the image capturing apparatus 1 to capture the image of the to-be-measured object according to the capturing instruction.

In step S902, the measurement area selection module 244 determines the position of each general location area on the image of the to-be-measured object according to the position of each general location area recorded in the script.

In step S903, the measurement area selection module 244 moves the standard image recorded in the script at a predetermined displacement within the general location area, computes the difference between the standard image and the alternative image, and records the position of a corresponding alternative area of the difference. The measurement area selection module 244 repeats this step until all difference between other alternative images and the standard image are determined and obtained.

In step S904, the measurement area selection module 244 selects a minimal difference in all the differences and determines the measurement area according to the position of the corresponding area of the minimal difference.

In step S905, the measuring module 245 takes the central point of the measurement area as a measurement point.

In step S906, the measuring module 245 implements a measuring instruction according to the measurement require.

In step S907, the measuring module 245 displays the measured result through the display 23 and stores the measured result in the data storage 21. Then the procedure returns to the step S801 and repeats until all the to-be-measured objects are measured.

Although the present invention has been specifically described on the basis of a preferred embodiment, the invention is not to be construed as being limited thereto. Various changes or modifications may be made to the embodiment without departing from the scope and spirit of the invention.

What is claimed is:

1. A positioning measurement apparatus comprising:
a data storage;
a central processing unit (CPU) comprising:
an object image capturing module for capturing images of a standard object and to-be-measured objects;
a standard model determining module for selecting one or more standard points from the image of the standard object, and selecting a general location area and a standard area by taking each standard point as a reference point;
a script generation module for generating a script for recording positions of each general location area and capturing a standard image in each standard area, and storing the script into the data storage; and
a measurement area selection module for determining the position of the general location area on the image of the to-be-measured object according to the position of general location area recorded in the script, and determining a measurement area, the image in the measurement area is most similar to the standard image within the general location area.

2. The apparatus as described in claim 1, wherein the CPU further comprises a measurement module for selecting the reference point of each measurement area as a measurement point, and measuring distance between two measurement points.

3. The apparatus as described in claim 1, wherein the CPU further comprises a measurement module for measuring chroma of the to-be-measured objects by computing RGB values of the measurement area.

4. The apparatus as described in claim 1, wherein when determining the measurement area, the measurement area selection module is further for moving the standard image recorded in the script at a predetermined displacement within the general location area to obtain an alternative area where the standard image is located, computing a difference between the standard image and each alternative image in each alternative area, recording a position of each alternative area, selecting a minimal difference in all the differences, and determining the measurement area which has a minimal difference.

5. The apparatus as described in claim 4, wherein the difference between the standard image and the alternative image is computed according to a formula $$D_{1m} = \sum_{i=i+1}^{i=n} [Ti - Ii]2,$$

$T_i$ and $I_i$ are luminance of each pixel of the standard image and the alternative image respectively, n is a total number of pixels in the standard image and the alternative image, i is a natural number and is less or equal to n.

6. A positioning measurement method comprising:
capturing images of a standard object and to-be-measured objects;
selecting one or more standard points from the image of the standard object;
selecting a general location area and a standard area by taking each standard point as a reference point;
generating a script for recording positions of each general location area and capturing a standard image in each standard area;
storing the script into the data storage;
determining the position of the general location area on the image of the to-be-measured object according to the position of general location area recorded in the script; and
determining a measurement area, the image in the measurement area is most similar to the standard image within the general location area.

7. The method as described in claim 6, further comprising selecting the reference point of each measurement area as a measurement point, and measuring distance between two measurement points.

8. The method as described in claim 6, further comprising measuring chroma of the to-be-measured objects by computing RGB values of the measurement area.

9. The method as described in claim 6, wherein the step of determining a measurement area further comprises:
moving the standard image recorded in the script at a predetermined displacement within the general location area to obtain an alternative area where the standard image locates;
computing a difference between the standard image and each alternative image in each alternative area;
recording a position of each alternative area;
selecting a minimal difference in all the differences; and
determining the measurement area which has a minimal difference.

10. The apparatus as described in claim 9, wherein the difference between the standard image and the alternative image is computed according to a formula $$D_{1m} = \sum_{i=1}^{i=n} [Ti - Ii]2,$$

$T_i$ and $I_i$ are luminance of each pixel of the standard image and the alternative image respectively, n is the total number of the pixels in the standard image and the alternative image, i is a natural number and is less or equal to n.

* * * * *